US008081821B1

(12) United States Patent
Schaem

(10) Patent No.: US 8,081,821 B1
(45) Date of Patent: Dec. 20, 2011

(54) CHROMA KEYING

(75) Inventor: Stephan Schaem, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 669 days.

(21) Appl. No.: 12/211,443

(22) Filed: Sep. 16, 2008

(51) Int. Cl.
*G06K 9/34* (2006.01)
(52) U.S. Cl. ....................................................... 382/173
(58) Field of Classification Search .................. 382/162, 382/163, 164, 173, 202, 218–219, 282; 345/587, 345/592; 348/239, 586
See application file for complete search history.

(56) References Cited

U.S. PATENT DOCUMENTS

| | | | |
|---|---|---|---|
| 5,400,081 A | 3/1995 | Chaplin | |
| 6,204,859 B1 * | 3/2001 | Jouppi et al. .................. | 345/592 |
| 6,288,703 B1 | 9/2001 | Berman et al. | |
| 6,549,659 B1 * | 4/2003 | Welch et al. .................. | 382/203 |
| 6,553,140 B1 | 4/2003 | Soupliotis et al. | |
| 6,707,940 B1 | 3/2004 | Qian | |
| 6,950,130 B1 | 9/2005 | Qian | |
| 7,079,151 B1 | 7/2006 | Rublee | |
| 7,085,413 B2 | 8/2006 | Huang et al. | |
| 2002/0027617 A1 | 3/2002 | Jeffers et al. | |
| 2003/0090507 A1 | 5/2003 | Randall et al. | |
| 2006/0045332 A1 | 3/2006 | Park | |
| 2006/0239548 A1 | 10/2006 | Gallafent et al. | |

FOREIGN PATENT DOCUMENTS

| | | |
|---|---|---|
| GB | 2408887 | 6/2005 |
| WO | WO 2006/010276 | 2/2006 |
| WO | WO 2009/026388 | 2/2009 |

OTHER PUBLICATIONS

Adobe—Flash Article, "Creating a Talking-Head Flash Video," Jun. 1, 2007, 9 pages.

"Ultimatte AdvantEdge User Guide," Ultimate Corporation, 2002-2006, 75 pages.
"Gamma correction," Wikipedia, Aug. 7, 2008, 10 pages.
"Digital compositing," Wikipedia, Jul. 28, 2008, 4 pages.
"Alpha compositing," Wikipedia, Aug. 9, 2008, 4 pages.
"CIE 1931 color space" Wikipedia, Aug. 3, 2008, 9 pages.
Alain Bouchard et al., "EXT_texture_sRGB," Jan. 24, 2007, 14 pages.
"Lose the background: Create an alpha channel with keying," Adobe Systems, Inc., 2006, 5 pages.
Schaem, Stephan, U.S. Appl. No. 11/895,162, filed Aug. 22, 2007, entitled "Generating a Clean Reference Image."
Kumar, Pavan, U.S. Appl. No. 12/191,676, filed Aug. 14, 2008, entitled "Reuse of Image Processing Information."

* cited by examiner

*Primary Examiner* — Duy M Dang
(74) *Attorney, Agent, or Firm* — Fish & Richardson P.C.

(57) ABSTRACT

Systems, methods, and apparatus, including software tangibly stored on a computer readable medium, involve receiving reference data and source data. The reference data includes a portion of a background image, and the background image includes an image of a background. The source data includes a portion of a source image, and the source image includes an image of the background and a foreground. A reference saturation value, which relates to a saturation of the portion of the background image, is calculated based on the reference data. A difference value, which relates to a difference between the portion of the background image and the portion of the source image, is calculated based on the source data and the reference data. A source image weighting value is determined based at least in part on a ratio between the difference value and the reference saturation value. The source image weighting value is stored, for example, in a machine-readable medium. The source image weighting value can be used for combining the source image with a replacement background image, which includes an image of a replacement background. Multiple source image weighting values can be calculated, for example, to generate an alpha channel for the source image.

20 Claims, 12 Drawing Sheets

CHROMA KEYING

BACKGROUND

The present disclosure relates to chroma keying. Chroma keying is used in many applications to identify foreground regions and background regions in an input image. Chroma keying is also referred to as "color keying" or "color-separation overlay" (CSO). Chroma keying is typically applied to images of foreground objects (e.g., a person) in front of a backdrop having a single color or a relatively narrow range of colors. For example, in television broadcasts, a weather reporter often stands in front of a blue or green screen, and chroma keying is used to replace the blue or green screen with a weather map. The backdrop is commonly blue or green because those colors tend not to be found in skin tones. Chroma keying typically generates a foreground image and an alpha channel. The foreground image portrays the foreground objects, but with the blue or green backdrop substantially removed from the image. The alpha channel specifies the transparency and/or opacity of different regions of the foreground image. When the foreground image is combined with a replacement background, the alpha channel can be used to determine where the replacement background is visible, partially visible, or invisible in the combined image.

SUMMARY

This specification describes technologies relating to chroma keying.

In general, one aspect of the subject matter described in this specification can be embodied in a method that includes receiving reference data and source data. The reference data includes a portion of a background image, and the background image includes an image of a background. The source data includes a portion of a source image, and the source image includes an image of the background and a foreground. A reference saturation value, which relates to a saturation of the portion of the background image, is calculated based on the reference data. A difference value, which relates to a difference between the portion of the background image and the portion of the source image, is calculated based on the source data and the reference data. A source image weighting value is determined based at least in part on a ratio between the difference value and the reference saturation value. The source image weighting value is stored, for example, in a machine-readable medium. The source image weighting value can be used for combining the source image with a replacement background image. The replacement background image includes an image of a replacement background. Other embodiments of this aspect include corresponding systems, apparatus, and computer program products.

These and other embodiments can optionally include one or more of the following features. The source image weighting value relates to whether the source data corresponds to a foreground region of the source image or a background region of the source image. The source data is a source vector in a color space, and the reference data is a reference vector in the color space. The difference value is a magnitude of a result of subtracting a component of the reference vector from a component of the source vector. The reference saturation value includes a magnitude of a component of the reference vector. The source data and/or the reference data is transformed from a first color space representation to an XYZ color space representation. The XYZ color space includes an XY-plane. The reference saturation value is related to a magnitude of a component of the reference vector in the XY-plane. The difference value is related to a difference between a component of the source vector in the XY-plane and a component of the reference vector in the XY-plane. Foreground data is calculated based at least in part on the source image weighting value. The source image is combined with a replacement background image to generate a composited image based on the source image weighting value. Combining the source image with the replacement background image includes receiving replacement data including the replacement background image, scaling the foreground data by a first factor that is based at least in part on the source image weighting value, scaling the replacement data by a second factor that is based at least in part on the source image weighting value, and summing the scaled foreground data and the scaled replacement data. The reference data includes a single pixel of the first background image and the source data includes a single pixel of the source image. The reference data includes multiple pixels of the first background image and the source data includes multiple pixels of the source image. The source data and/or the reference data include a vector in a device-independent color space. Determining a source image weighting value includes calculating a dot product between a difference vector and a reference vector and calculating the source image weighting value based on the dot product and the ratio. The difference vector relates to the difference between the portion of the source image and the portion of the first background image. The reference vector relates to the portion of the first background image. The received source data is transformed from a first color space to an XYZ color space, and foreground data is generated based at least in part on the transformed source data. The generated foreground data is transformed from the XYZ color space to the first color space. The source data includes a source luminance component and a source chrominance component. The reference data includes a reference luminance component and a reference chrominance component. The reference saturation value is calculated based at least in part on the reference chrominance component. The difference value is calculated based at least in part on the reference chrominance component and the source chrominance component. The described techniques can be implemented in methods, systems, apparatus, computer program products, or otherwise, tangibly stored on a computer readable medium as instructions operable to cause programmable processor to perform actions.

Particular embodiments of the subject matter described in this specification can be implemented to realize one or more of the following advantages. An improved alpha channel is generated. The improved alpha channel more accurately identifies the opacity of foreground objects. An improved color channel is generated. The improved color channel more accurately portrays foreground objects. A technique for generating an alpha channel and/or a color channel requires less input from a user (e.g., less manual manipulation of an image, less manipulation of image processing parameters, fewer input parameters, and/or others). The amount of "tweaking" (e.g., manual and/or automated adjusting) that is needed to produce acceptable alpha channel values and/or acceptable color channel values may be reduced. An alpha channel value may be generated based on the chrominance of a source image. Operations may be implemented using hardware and/or software that utilizes stream processor architecture, multithreading processor optimization, single instruction multiple data (SIMD) processor optimization, and/or any of a wide range of Graphics Processing Units (GPUs). Implementations may allow faster-than-real-time processing of large digital image sources (e.g., larger than 4K digital film sources).

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIGS. 1B and 1F are an example source image; FIGS. 1C and 1G are example color channel images; FIGS. 1D and 1H illustrate example alpha channels; FIGS. 1E and 1I are example composited images.

FIG. 2B illustrates an example input processing module of a chroma keying process; FIG. 2C illustrates an example core module of a chroma keying process; FIG. 2D illustrates an example alpha channel module of a chroma keying process; FIG. 2E illustrates an example color channel module of a chroma keying process; FIG. 2F illustrates an example output processing module of a chroma keying process.

Like reference numbers and designations in the various drawings indicate like elements.

DETAILED DESCRIPTION

Figure 1A:
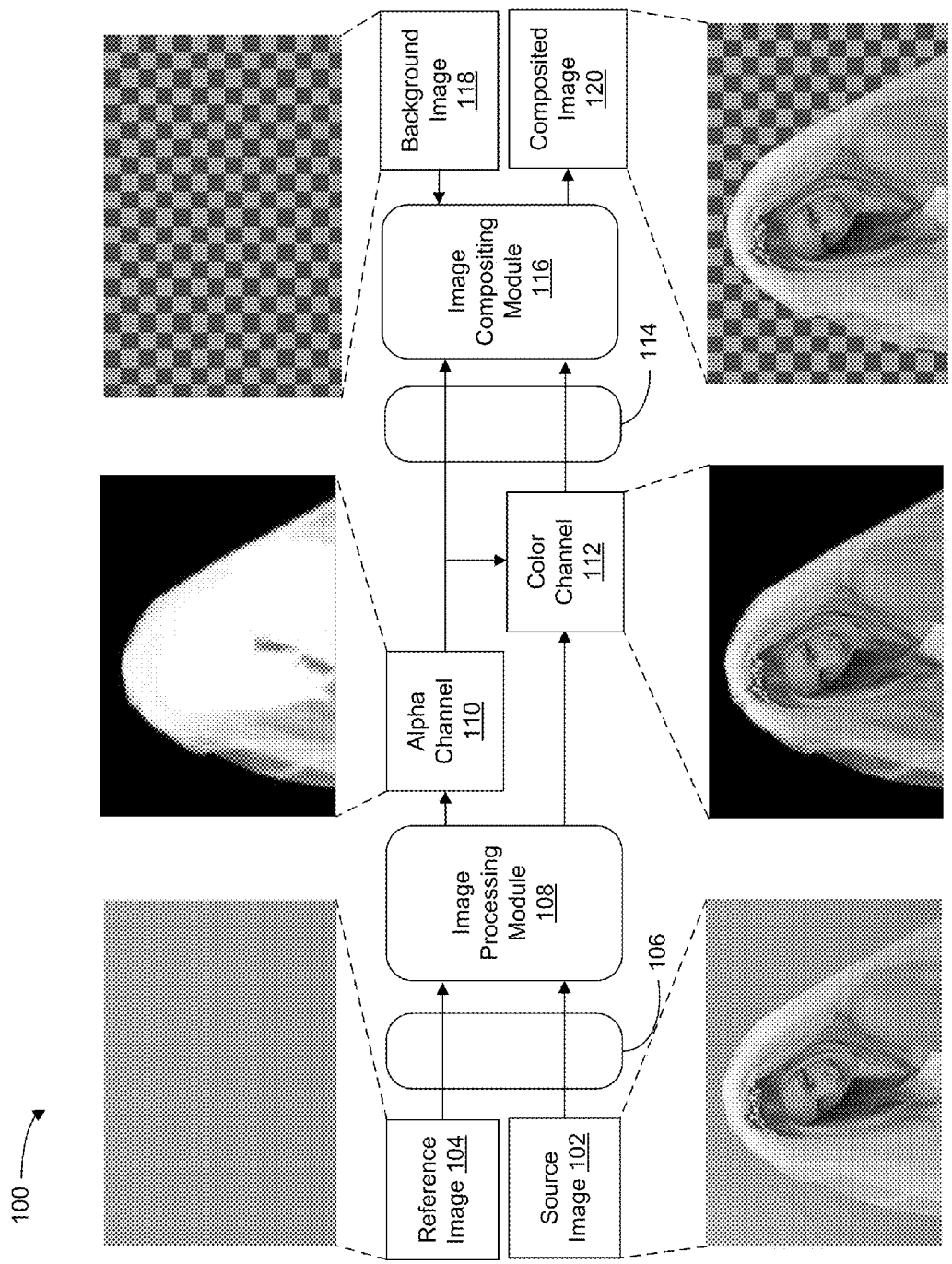
FIG. 1A is an example implementation of chroma keying.

FIG. 1A is an illustration of an example process 100 that implements chroma keying. The example process 100 identifies foreground regions and background regions of a source image 102 and generates a composited image 120 by replacing the background regions with a replacement background. The source image 102 includes a picture of a person in front of a green backdrop; the person is the foreground, and the backdrop is the background. The process 100 distinguishes the foreground and background regions based on a reference image 104 of the backdrop. The process 100 generates an alpha channel 110 and a color channel 112 based on the source image 102, the reference image 104, and other input parameters. The color channel 112 portrays the source image 102 without the background components, and the alpha channel 110 indicates which regions of the color channel 112 correspond to the foreground and which regions of the color channel 112 correspond to the removed background. The alpha channel 110 is generated based on a difference image (not illustrated), which is the difference between the source image 102 and the reference image 104. The difference image is normalized by the saturation of the reference image 104. For example, the difference image may be normalized by computing a ratio of the difference image magnitude and the saturation of the reference image. Normalizing the difference image by the saturation of the reference image may improve the quality of the alpha channel 110, the quality of the color channel 112, and/or the robustness of the chroma keying process. The normalization may reduce the amount of "tweaking" (e.g., manual and/or automated adjustments) that is needed to produce an acceptable alpha channel value and/or an acceptable color channel value. In some cases, the process 100 can account for non-ideal properties and/or variations in the reference image 104. For example, image data may be processed on the pixel level to detect and account for variations in luminance (e.g., due to non-uniform lighting of the background), variations in hue (e.g., due to non-ideal lighting of the background), and/or other types of variations.

Figure 1C:
FIGS. 1B-1I are example images generated in connection with a chroma keying process.
Figure 1E:
Figure 1B:
Figure 1D:
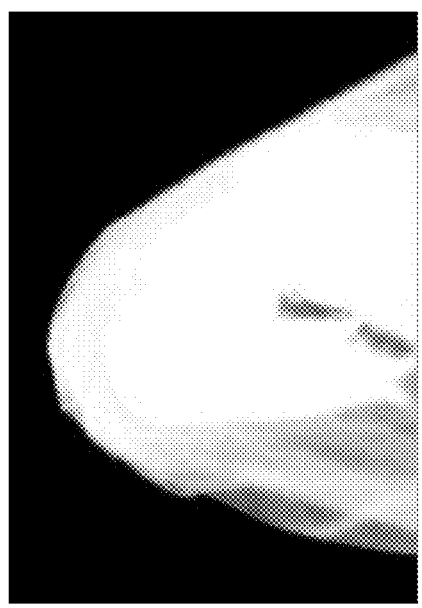

FIGS. 1B-1I are example images that may be obtained, used, and/or generated in association with a chroma keying process. FIG. 1B is the source image 102 of FIG. 1A. FIGS. 1C-1E are generated based on the magnitude of a difference image that is normalized by the saturation of the reference image 104. FIG. 1C is the color channel 112 of FIG. 1A, FIG. 1D is the alpha channel 110 of FIG. 1A, and FIG. 1E is the composited image 120 of FIG. 1A. The composited image 120 is based on the alpha channel of FIG. 1D, the color channel of FIG. 1C, and the background image 118 of FIG. 1A.

Figure 1G:
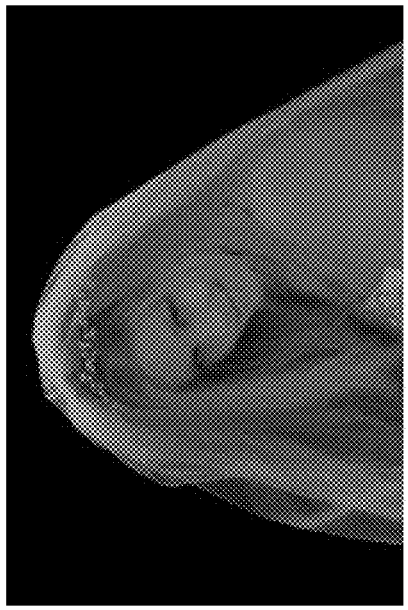
Figure 1I:
Figure 1F:
Figure 1H:
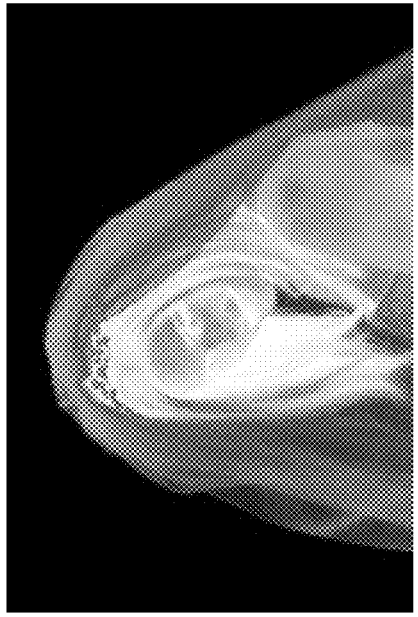

FIG. 1F is the source image 102 of FIG. 1A. FIG. 1G is a color channel image that is generated based on the source image 102. The color channel image of FIG. 1G is based on a difference image value that is not normalized by the saturation of the reference image 104. Visual inspection reveals that the color channel of FIG. 1C more accurately represents the foreground objects of the source image 102 than the color channel of FIG. 1G represents the foreground objects. For example, the color channel of FIG. 1G appears faded and, in a color example (not shown), tends to represent the person's skin with a red tint. FIG. 1H is an alpha channel that is generated based on the source image 102. The alpha channel represented in FIG. 1H is based on a difference image value that is not normalized by the saturation of the reference image 104. FIG. 1I is a composited image based on the color channel of FIG. 1G, the alpha channel of FIG. 1H, and the background image 118 of FIG. 1A.

In FIG. 1I, the foreground appears transparent in regions where the foreground is substantially opaque in FIG. 1E. The replacement background (black and grey checks) appears to show through the foreground in FIG. 1I where substantially no replacement background appears to show through the foreground in FIG. 1E. For example, the black and grey checks show through the person's arm and face in FIG. 1I while the black and grey checks do not significantly show through the person's arm and face in FIG. 1E. In the source image 102, the green backdrop is not visible through the person's arm and face, and the alpha channel should represent the person's arm and face as having a substantially minimum transparency (substantially opaque, in this example). Accordingly, the alpha channel of FIG. 1D more accurately represents the transparency/opaqueness of the foreground object.

According to the illustrated example process 100, the source image 102 and the reference image 104 are received as inputs to an input processing module 106. The source image 102 includes an image of foreground objects in front of a background. The reference image 104 includes an image of the background. The input processing module 106 can apply input image processing operations to the source image 102 and the reference image 104. The source image 102 and the reference image 104 may be obtained in a first format, and the input processing module 106 may convert the obtained images to a second format. For example, the source image 102 and the reference image 104 may be obtained in a non-linear RGB color space representation, and the input processing module may convert the obtained images to a linear RGB color space representation and/or to an XYZ color space representation. Operations of an example input processing module 106 are illustrated in FIG. 2B.

The image processing module 108 receives the source image 102 and the reference image 104 that have been processed by the input processing module 106. The image processing module 108 computes a saturation value based on the received reference image data. The image processing module 108 computes a difference image based on the received reference image data and the received source image data. The image processing module 108 normalizes the difference image value based on the saturation value. For example, the image processing module 108 may compute a ratio based on the difference image value and the saturation value. The image processing module uses the normalized difference image value to generate the alpha channel 110 and the color channel 112. Operations of an example image processing module 108 are illustrated in FIGS. 2A, 2C, 2D, and 2E.

The alpha channel 110 includes source image weighting values for combining the source image 102 with a replacement background image. For example, the alpha channel 110 can include values that range from 0 to 1 for each of multiple image regions (e.g., pixels, objects, groups of pixels, etc.) of the source image 102. Each source image weighting value identifies how source image data for a region should be scaled or weighted when the source image data is combined with the replacement background. A source image weighting value may effectively identify a transparency of foreground objects. For example, a source image weighting value of 1 indicates that the corresponding source image data appears opaque, a source image value of 0 indicates that the corresponding source image data appears fully transparent, and a source image value of 0.5 indicates that the corresponding source image data appears 50% transparent. Similarly, a source image weighting value may effectively identify an extent to which the replacement background is visible. For example, a source image weighting value of 1 indicates that the replacement background is not visible in a corresponding region of a composited image, a source image weighting value of 0 indicates that the replacement background is fully visible in a corresponding, region of a composited image, and a source image weighting value of 0.75 indicates that the replacement background is partially (e.g., 25%) visible in a corresponding region of a composited image. The source image 102 can be combined with a replacement background by first generating a foreground image, and then by combining the foreground image with the replacement background. When the foreground image and the replacement background image are combined, each pixel of the foreground image can be scaled according to the corresponding source image weighting value, each pixel of the replacement background image can be scaled according to one minus the corresponding source image weighting value, and the scaled values can be summed to form a composited image.

The color channel 112 is an example of a foreground image that can be combined with a replacement background to generate a composited image. The color channel 112 may represent the foreground regions of the source image 102 with the background regions and/or background components completely or substantially removed. For example, the source image 102 may include regions that purely represent the background. These regions can be substantially removed from the image by subtracting the background image from the source image and/or by other techniques (e.g., filtering and others). In the illustrated example, regions of the source image 102 that represent the green background appear black in the color channel 112, since the background regions have been removed. In addition to the regions that are purely background, the source image 102 may include foreground image regions that are affected by the presence of the background. For example, the background color may "spill" onto and/or show through foreground objects. The color channel 112 can represent the foreground regions with the effects of the background completely, partially, or substantially removed and/or compensated. As an example, the source image 102 portrays a person wearing a veil. The green background is visible through portions of the veil. The color channel 112 portrays the veil substantially without the effect of the green background showing through the veil. As another example, a source image may include a foreground region (e.g., a shiny surface, and/or others) that reflects a portion of the background. The color channel 112 can portray the region substantially without the effects of the background. Additionally or alternatively, the color channel 112 may include foreground objects with other types of background effects removed. In some cases, the color channel 112 is generated based in part on the alpha channel 110.

The output processing module 114 can apply output image processing techniques to the alpha channel 110 and/or the color channel 112. The alpha channel 110 and the color channel 112 may be obtained in a first format, and the output processing module 114 may convert the obtained images to a second format. For example, the color channel 112 may be obtained in an XYZ color space representation, and the output processing module 114 may convert the obtained color channel 112 to a linear RGB color space representation and/or to a non-linear RGB color space representation. Operations of an example output processing module 114 are illustrated in FIG. 2F. The illustrated modules 106, 108, and 114 and/or additional modules may implement additional image processing operations in connection with chroma keying.

The image compositing module 116 combines the foreground of the source image 102 (represented by the color channel 112) with a replacement background image 118 to generate the composited image 120. The example image compositing module 116 scales each pixel of the color channel 112 by a corresponding source image weighting value in the alpha channel 110. The example image compositing module 116 scales each pixel of the background image 118 by one minus the corresponding source image weighting value in the alpha channel 110. The example image compositing module 116 sums the scaled color channel data and the scaled background image data to generate the composited image. Other examples of an image compositing module 116 may combine the source image 102 with the background image 118 according to other techniques.

The images illustrated in FIGS. 1A-1I are digital images. An image can be an image file, part of an image file, or multiple image files stored in a computer memory, a storage device, and/or another medium. An image or an image file can be stored as an electronic document or part of an electronic document. An electronic document does not necessarily correspond to a file. A document may be stored in a portion of a file that holds other documents, in a single file dedicated to the document in question, or in multiple coordinated files. An image can include text, raster, and vector objects. A raster image includes an array (e.g., a rectangular or Cartesian array) of pixels. A pixel may include one or more values that collectively represent a color. For example, a pixel may be a 3-vector (or any other length vector) that represents a color in a color space. A pixel may be a scalar value that represents a gray scale color. Color information is typically specified in terms of a color space. An image may be represented in any type of color space, such as linear color spaces, non-linear color spaces, device independent color spaces, and device dependent color spaces. Specific examples of color spaces include Red, Green and Blue (RGB); Cyan, Magenta, Yellow and Black (CMYK); Yellow Chromate Conversion (YCC); Hue, Saturation, and Brightness (HSB); Hue, Saturation, and Luminance (HSL); Hue, Saturation, and Value (HSV); XYZ; and/or Grayscale. Example device-independent color spaces include those developed by the International Commission on Illumination (CIE) in 1931, and others. In the examples described here and shown in FIGS. 1A-11, 2A-2F, 3A, 3B, and 4, image data is expressed in an XYZ color space where the Z component includes luminance information and the X and Y components include chrominance information. For example, a pixel that has X and Y values of zero indicates a grey-scale value, having no chrominance component. The saturation, which relates to the intensity of the color information, can be the magnitude of the chrominance components of the pixel. For example, the saturation of a color in an XYZ color space can be calculated based on the magnitude of the X and Y components. In other color spaces, saturation can be computed differently. While many color spaces can be used to implement the techniques described and illustrated here, the XYZ color space described and illustrated in the present disclosure is not the XYZ color space developed by CIE. Rather, the XYZ color space described and illustrated here shares some properties with the xyY color space developed by CIE. However, there are differences between the XYZ color space used here and the xyY color space developed by CIE. For example, the xyY color space developed by CIE specifies a white point at the coordinates (0.31, 0.33) in the xy-plane, while the XYZ color space used here specifies a white point at the coordinates (0, 0) in the XY-plane (e.g., at point 302g in FIGS. 3A and 3B).

Figure 2A:
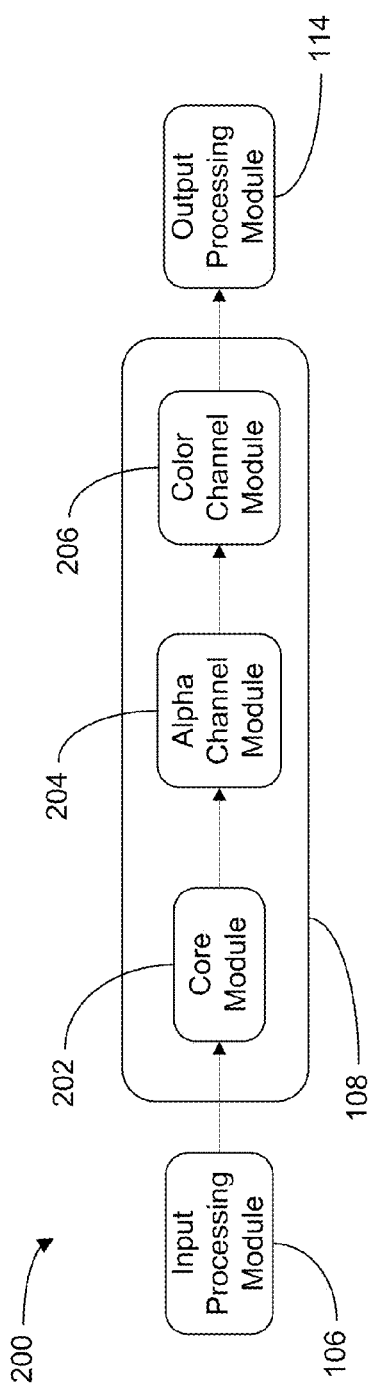
FIG. 2A is a flow chart illustrating an example chroma keying process.
Figure 2B:
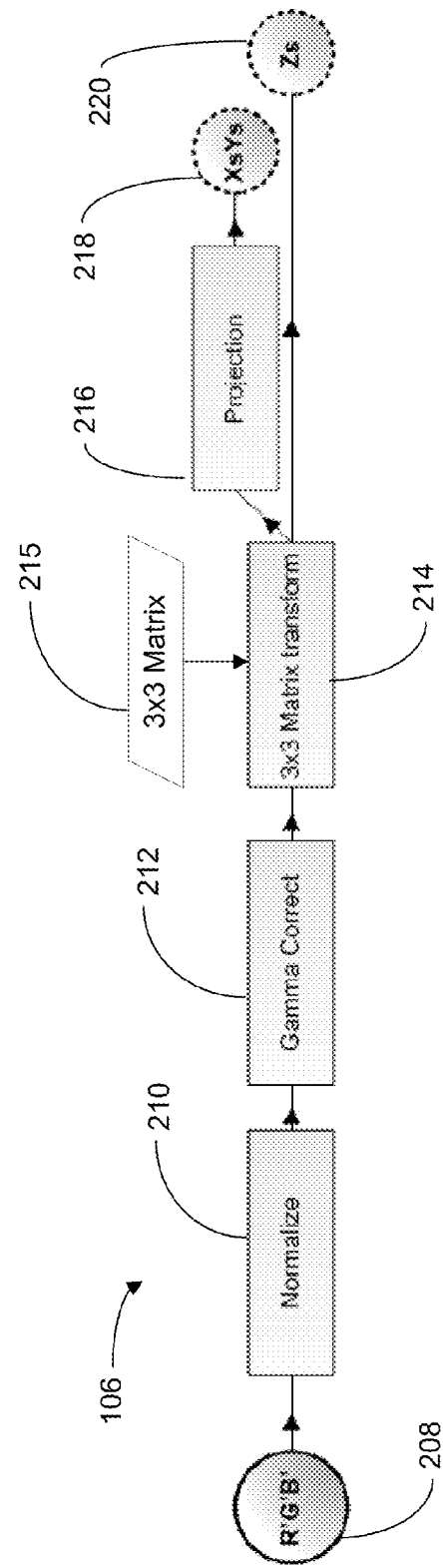
FIGS. 2B-2F are flow charts illustrating example modules of a chroma keying process.

FIG. 2A is flow chart illustrating an example chroma keying process 200. The input processing module 106 obtains inputs and provides data for use by the image processing module 108. The image processing module 108 includes three illustrated sub-modules: a core module 202, an alpha channel module 204, and a color channel module 206. The image processing module 108 provides data for use by the output processing module 114. The example modules 106, 202, 204, 206, and 114 are illustrated in more detail in FIGS. 2B-2F. The process 200 may also be referred to as a pixel pipeline. Each pixel of a source image may be processed individually by the pixel pipeline. In some cases, portions of a source image are processed in series and/or in parallel in the process 200. The modules illustrated in FIGS. 2B-2F include process parameters illustrated as parallelogram shapes (e.g., tolerance 240, tolerance 244, noise level 264, transparency 256). The process parameters may include adjustable values and/or constant values. For example, a process parameter may be set or adjusted by a user; a process parameter may be an optimized, substantially optimized, or otherwise preferred value; a process parameter may be calculated or adjusted based on an automated technique; a process parameter may be omitted; or a process parameter may be obtained and/or treated differently.

FIG. 2B illustrates an example input processing module 106 of the chroma keying process 200. Source data 208 includes a pixel from a source image represented in an R'G'B' color space (non-linear RGB color space). At 210, the source data 208 is normalized to a pre-determined range of values. For example, the source data 208 may include integer values in the range of 0 to 255, and the normalization may scale the source data 208 to a decimal value in the range of 0.0 to 1.0. For instance, 24 bit non-linear sRGB source data can be converted to floating point values and divided by 255.0. At 212, the normalized source data is gamma corrected. Conventional techniques and formulae for gamma correction may be used to map the normalized sRGB source data to the linear RGB domain. At 214, the RGB source data is transformed to the XYZ color space. Conventional techniques and formulae may be used to transform to the XYZ color space. For example, a 3×3, transformation matrix parameter 215 may be applied to the RGB source data vector to map the RGB source data vector to a corresponding XYZ source data vector.

Some or all of the functionality achieved by the operations illustrated in the example process 200 can be achieved using different operations. For example, the operations implemented at 210, 212, 214, and/or others can be implemented in hardware and/or software using a lookup table. Similarly, the operations implemented at 294, 296, 298, and/or others in FIG. 2F can be implemented in hardware and/or software using a lookup table. An example lookup table for implementing the operations 210, 212, and 214 transforms an 8 bit integer (ranging from 0 to 255) to a 32 bit floating point value, based on the formula $v/=255;$ if(v>0.04045f){
  v=pow(((v+0.055f)/1.055f), 2.40;
} else {
  v/=12.92f;
}.

In some cases, such a lookup table can be implemented to achieve correspondence between CPU and GPU implementations of conversion operations, data types, and data formats. For example, a programmable CPU can implement the lookup table by executing instructions encoded in software, and the GPU can implement the same lookup table using non-programmable hardware (e.g., a hard-wired color conversion table). The output of the 3×3 matrix transformation at 214 includes a Z source value 220 as well as X and Y components. At 216, the X and Y components of the XYZ source data are projected to effectively remove the luminance information. For example, the X and Y components may be divided by the Z source value 220 to generate the XY source data 218.

Figure 2C:
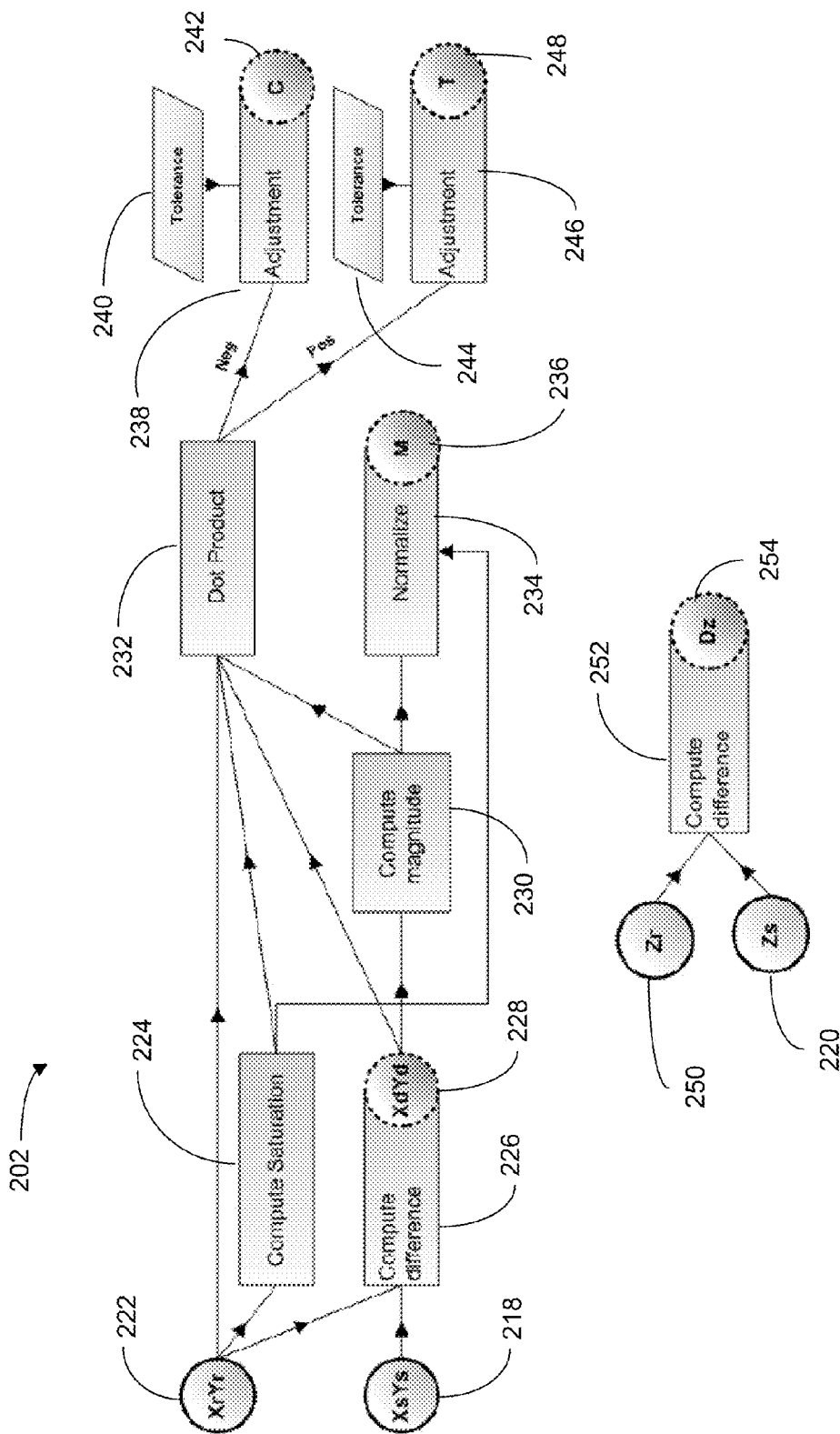

FIG. 2C illustrates an example core module 202 of the chroma keying process 200. The core module 202 generates a difference value and normalizes the difference value based on a saturation value of reference data. In the illustrated example, the normalization is implemented as a ratio calculation. The XY reference data 222 includes X and Y components of a portion of a reference image, represented in the XYZ color space. The reference data may be the result of pre-processing a portion of a reference image according to the input processing module 106. For example, the X and Y components may be projected X and Y components. At 224, the saturation of the XY reference data 222 is computed. For example, a reference saturation value S may be computed based on $r_x$—the X component of the XY reference data 222—and $r_y$—the Y component of the XY reference data 222—according to the equation $$S = \sqrt{r_x^2 + r_y^2}. \tag{1}$$

At 226, XY difference data 228 is computed based on the XY reference data 222 and the XY source data 218. For example, XY difference data 228 may be represented as $d_x$ and $d_y$ and computed based on $r_x$, $r_y$, $s_x$—the X component of the XY source data 218, —and $s_y$—the Y component of the XY source data—according to the equations $$\begin{cases} d_x = s_x - r_x \\ d_y = s_y - r_y. \end{cases} \quad (2)$$

At 230, the magnitude of the XY difference data 228 is computed. For example, m—the magnitude of the XY difference data 228—may be computed according to the equation $$m = \sqrt{d_x^2 + d_y^2}. \quad (3)$$

At 234, the difference data is normalized by computing a normalized magnitude 236, the normalized magnitude 236 is calculated as the ratio of the difference data and the saturation of the reference data. For example, M—the normalized magnitude of the XY difference data 228—may be computed according to the equation $$M = \frac{m}{s}. \quad (4)$$

At 232, a dot product is computed based on the magnitude m, saturation S, and the XY difference data 228. For example, the dot product D may be computed according to the equation $$D = \frac{1}{S \cdot m}(d_x r_x + d_y r_y). \quad (5)$$

At 238 and/or 246, adjustments are calculated based on the dot product D and tolerance parameters 240 and 244. The tolerance parameters 240 and 244 may be dependent or independent parameters. The tolerance parameters 240 may be used to determine a range of colors that represent a background region, to determine a range of colors that are removed from the source data to generate foreground data, and/or to determine a range of source data colors that result in a less-than-maximum source image weighting value. Two adjustment values C and T are calculated. If the dot product D is positive, the C value 242 and the T value 248 may be computed according to the equations $$\begin{cases} C = 1 - \text{tolerance} \\ T = 1 - D(\text{tolerance}). \end{cases} \quad (6)$$

If the dot product D is negative, the C value 242 and the T value 248 may be computed according to the equations $$\begin{cases} C = 1 - (1 + D)(\text{tolerance}) \\ T = 1. \end{cases} \quad (7)$$

At 252, Z difference data 254 is computed based on Z reference data 250 and the Z source data 220. For example, Z difference data 254 may be computed based on $r_z$—the Z component of the reference data—and $s_z$—the Z component of the source data—according to the equation $$d_z = s_z - r_z. \quad (8)$$

Figure 2D:
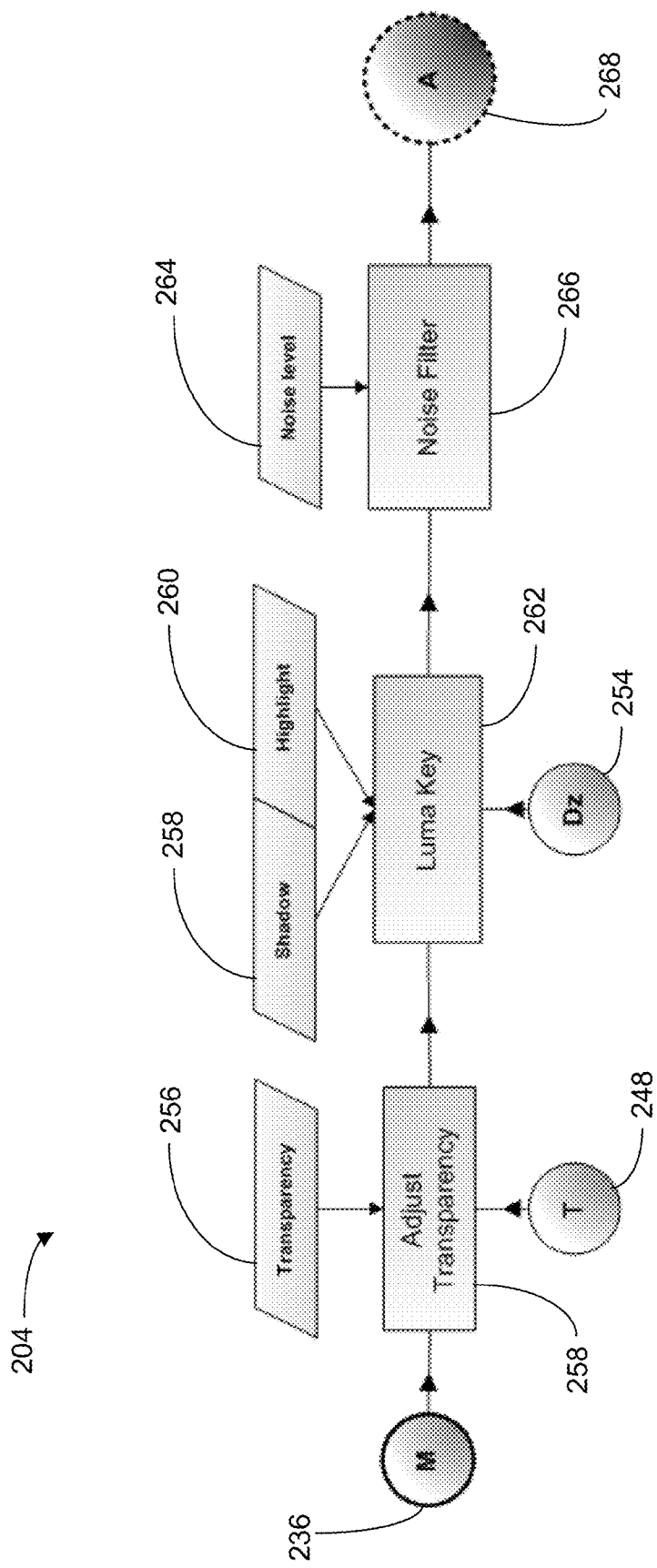

FIG. 2D illustrates an example alpha channel module 204 of the chroma keying process 200. The example alpha channel module 204 calculates a source image weighting value 268 based on the scaled magnitude 236, which may be provided by the normalization operation 234. At 258, a transparency value is adjusted based on the T value 248, a transparency parameter 256, and the scaled magnitude 236. For example, a value α may be calculated according to the equation $$\alpha = \text{clamp}(M \cdot T \cdot (\text{transparency})). \quad (9)$$

The transparency parameter 256 can indicate a maximum value for α. The clamp function can set a range of allowable output values for α. For example, the clamp function has the property $$\text{clamp}(x) = \begin{cases} 0, & \text{if } x < 0 \\ x, & \text{if } 0 \leq x \leq 1 \\ 1, & \text{if } x > 1 \end{cases} \quad (10)$$

The calculated value α may be further adjusted at 262 and/or 266 to generate the source image weighting value 268. For example, at 262, a luma key may be applied to the value α. The luma key may adjust α according to the luminance of the Z difference data 254 and based on a shadow parameter 258 and a highlight parameter 260. The highlight parameter can be used to adjust the calculated value α according to an increase in luminance between the reference image data and the source image data. The shadow parameter can be used to adjust the calculated value α according to an increase in luminance between the reference image data and source image data. The luma key operations at 262 can allow a user to control an appearance or an effect of shadows and/or highlights in a source image. In an example, a foreground element casts a shadow on the backdrop in the source image. In this case, the shadow color (e.g., the XY component of the source image region) is substantially identical to an area not in shadow, so the shadow area is considered fully transparent. The luma key operation at 262 extracts the shadow information from the image. In another example, a foreground element is in front of a moving backdrop that has creases or other topological features that cause shadows on the backdrop, and the luma key operation 262 extracts the shadow information from the image. The highlight parameter may be used in a similar manner to extract highlight information (e.g., increased luminance information) from the image.

At 266, a noise filter may be applied to the value α based on a noise level parameter 264. The noise filter may apply a ramping function to the value α to reduce noise. For example, the ramping function may apply the equation $$A = \text{clamp}(\alpha \cdot \text{noiseLevel}A - \text{noiseLevel}B) \quad (11)$$

where noiseLevelA and noiseLevelB are components of the noise level parameter 264. The noise level parameter 264 can specify signal variations that can be regarded as noise. The source image weighting value 268 may be generated based on additional, different, and/or fewer adjustments to the value α generated at 258.

Figure 2E:
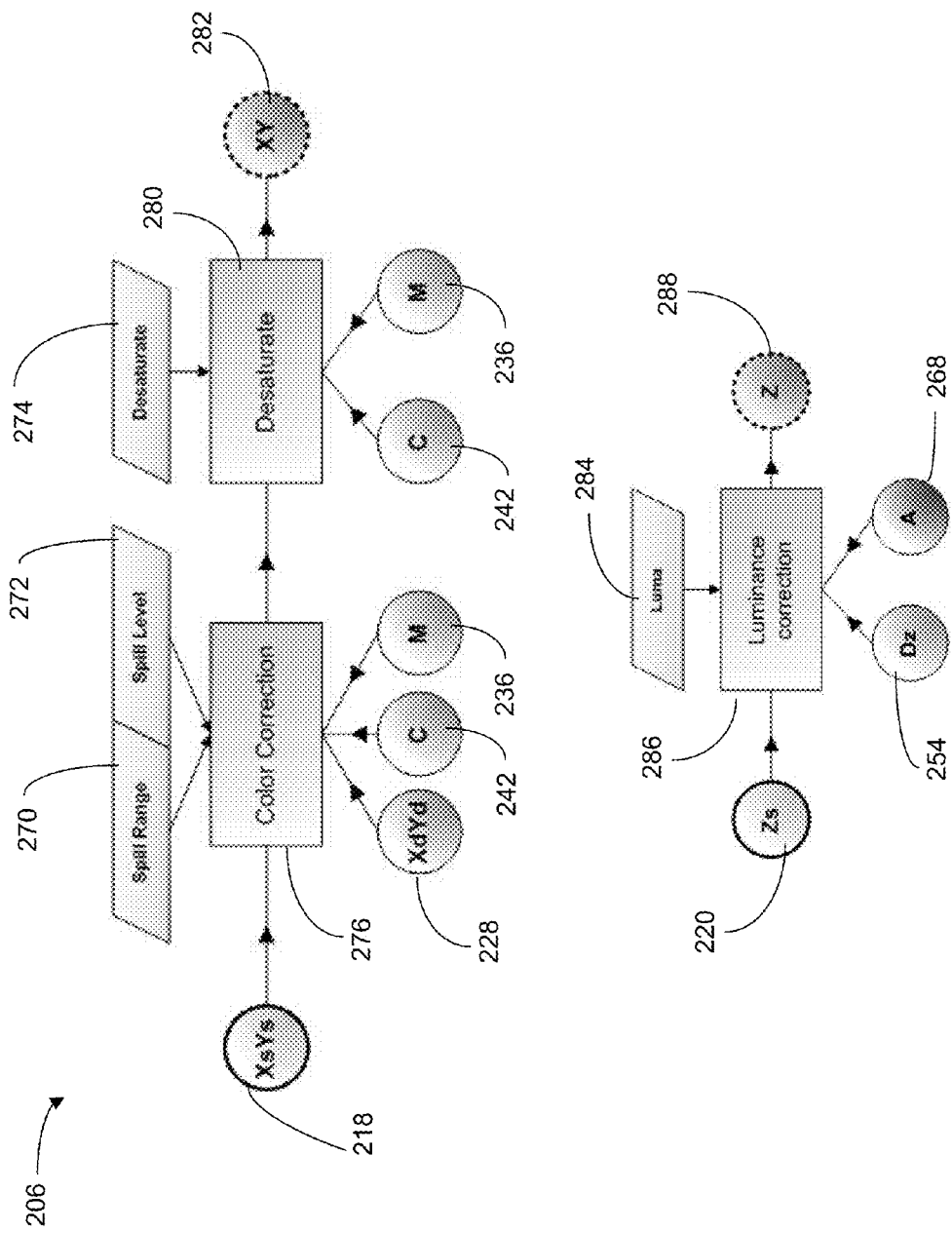
Figure 2F:
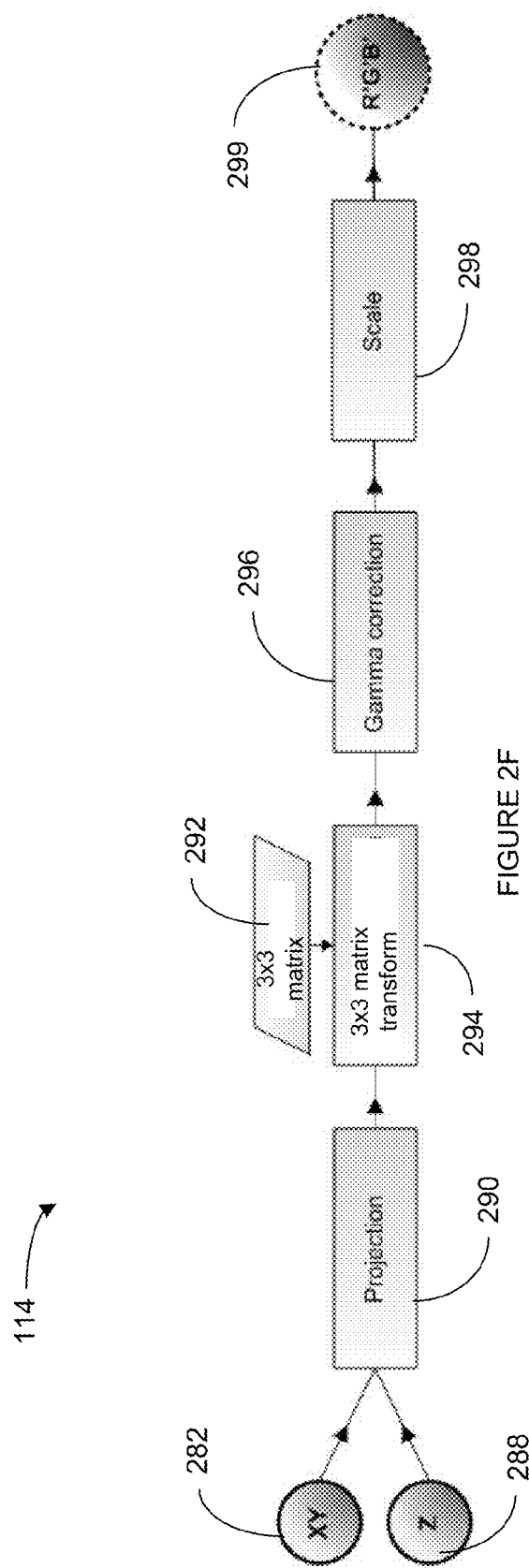

FIG. 2E illustrates an example color channel module 206 of the chroma keying process 200. The example color channel module 206 generates color channel data. The color channel data may include portions of the source data that represent foreground objects. The color channel module 206 can modify the source data to remove or reduce the appearance of a background in the source data and/or an effect of the background on the source data. At 276, color correction is applied to the XY source data 218. The color correction may be based on the XY difference data 228, the C value 242, the scaled magnitude 236, a spill range parameter 270, and a spill level parameter 272. For example, $c_x$—a color corrected X value—and $c_y$—a color corrected Y value—may be calculated according to the equations $$\begin{cases} c_x = s_x + d_x\left(\dfrac{1}{\text{clamp}(M \cdot C \cdot spillRange) - 1}\right)(spillLevel) \\ c_y = s_y + d_y\left(\dfrac{1}{\text{clamp}(M \cdot C \cdot spillRange) - 1}\right)(spillLevel). \end{cases} \quad (12)$$

The spill range parameter 270 can identify a range of colors to remove from the image, and the spill level parameter 272 can identify an amount of the identified color to remove. The color corrected X and Y data may be adjusted to generate the color channel XY data 282. For example, at 280, the color corrected X and Y data are adjusted to desaturate the X and Y data based on the C value 242, the scaled magnitude 236, and a desaturate parameter 274. The desaturate parameter 274 can identify a range of saturation values to adjust in an image. At 280, the color corrected X and Y data may be adjusted according to the equations $$\begin{cases} c_x = c_x \cdot \text{clamp}(M \cdot C \cdot desaturate) \\ c_y = c_y \cdot \text{clamp}(M \cdot C \cdot desaturate). \end{cases} \quad (13)$$

Color channel Z data 288 may be generated at 286 based on a luminance correction to the Z source data 220. The luminance correction may be based on the difference Z data 254, the source image weighting value 268, and a luma parameter 284. The color channel Z data may be calculated according to the equation $$c_z = \text{clamp}\left[s_z + d_z\left(\left(\dfrac{1}{a} - 1\right)(luma)\right)\right]. \quad (14)$$

Here, the luma parameter 284 selects an amount of luminance correction to perform. The color channel Z data may be further modified and/or adjusted.

FIG. 2F illustrates an example output processing module 114 of the chroma keying process 200. The output processing module converts the color channel XY data 282 and the color channel Z data 288 to color channel R'G'B' data 299. At 290, the color channel XY data 282 are un-projected to include luminance information. The un-projection module 290 may apply an operation that is the inverse of the operation applied by projection module 216 of the input processing module 106 in FIG. 2B. For example, the color channel XY data 282 may be multiplied by the color channel Z data 288. At 294, the un-projected XYZ color channel data are transformed from the XYZ color space to the RGB color space. For example, the transformation module 294 may apply a 3×3 transformation matrix parameter 292 to the un-projected XYZ color channel data to generate RGB color channel data. The 3×3 transformation matrix parameter 292 may be the mathematical inverse of the 3×3 transformation matrix parameter 215 of FIG. 2B. At 296, the RGB color channel data is gamma corrected. The operations applied at 296 may include the inverse of operations applied by the gamma correction module 212 of FIG. 2B. The gamma correction module 296 may apply an sRGB formula (or an inverse sRGB formula) to generate non-linear R'G'B' color channel data. The non-linear R'G'B' color channel data may include values in a range from 0.0 to 1.0. At 298, the non-linear R'G'B' color channel data may be scaled to a different range of values. For example, when the non-linear R'G'B' data includes 24 bit floating point values, each value can be multiplied by 255 and converted to an integer in the range of 0 to 255. A color channel can be constructed from the non-linear R'G'B' data 299, and an alpha channel can be constructed based on the source image weighting value 268.

The color channel R'G'B' data 299 can be used with the source image weighting value 268 and replacement background image data to generate a composited image. The replacement background image data may be scaled based on the source image weighting value, and the color channel data may be scaled based on the source image weighting value. The scaled values may be combined to produce composited image data. For example, the composited image data may be calculated according to the equations $$\begin{cases} p_r = Ac_r + (1 - A)n_r \\ p_g = Ac_g + (1 - A)n_g \\ p_b = Ac_b + (1 - A)n_b, \end{cases} \quad (15)$$

where $p_r$, $p_g$, and $p_b$ represent the red, green, and blue components of the composited image R'G'B' data, $c_r$, $c_g$, and $c_b$ represent the red, green, and blue components of the color channel R'G'B' data, and $n_r$, $n_g$, and $n_b$ represent the red, green, and blue components of the R'G'B' replacement background image data, respectively.

Figure 3A:
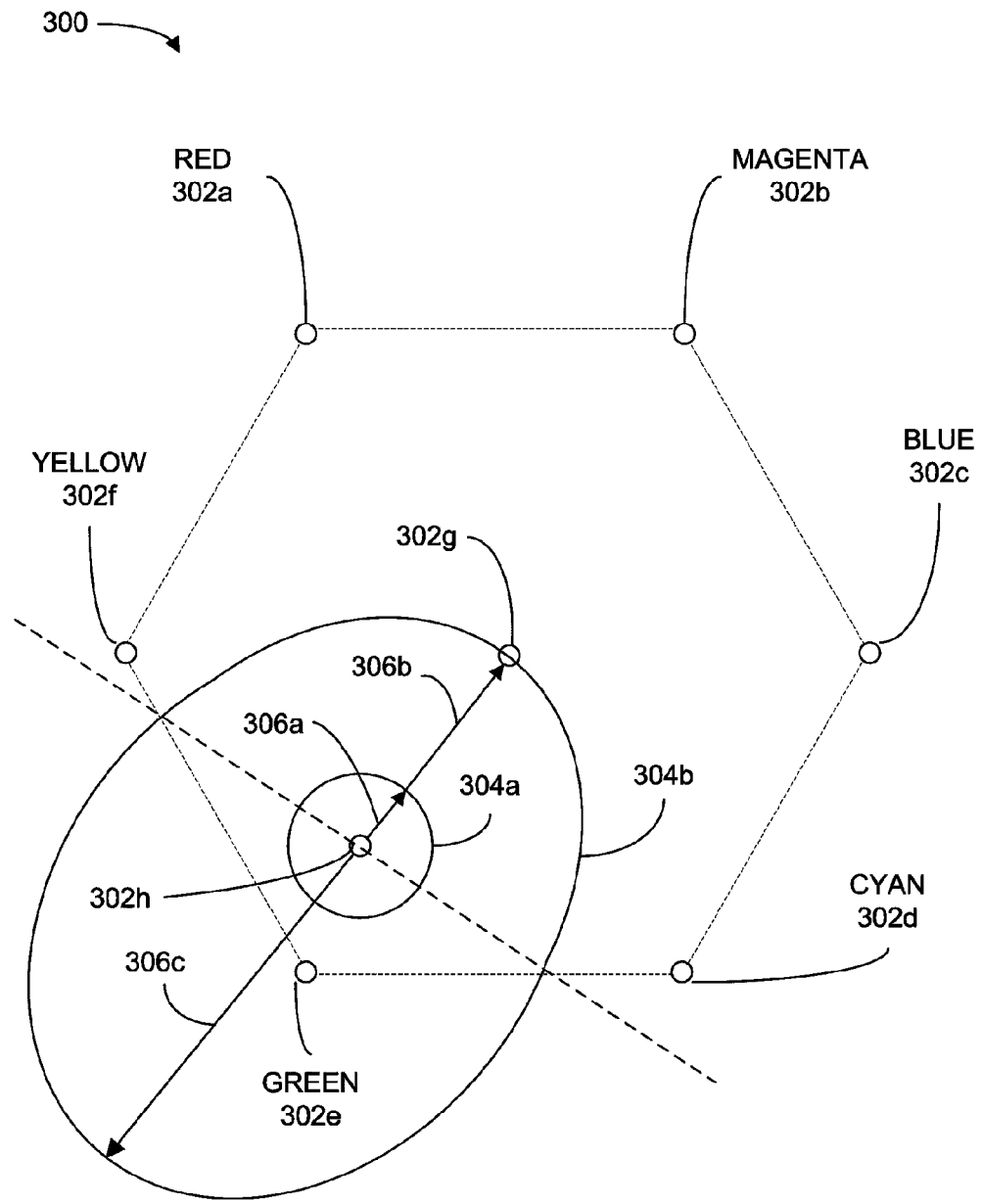
FIGS. 3A and 3B illustrate image data in a plane of an example color space.
Figure 3B:
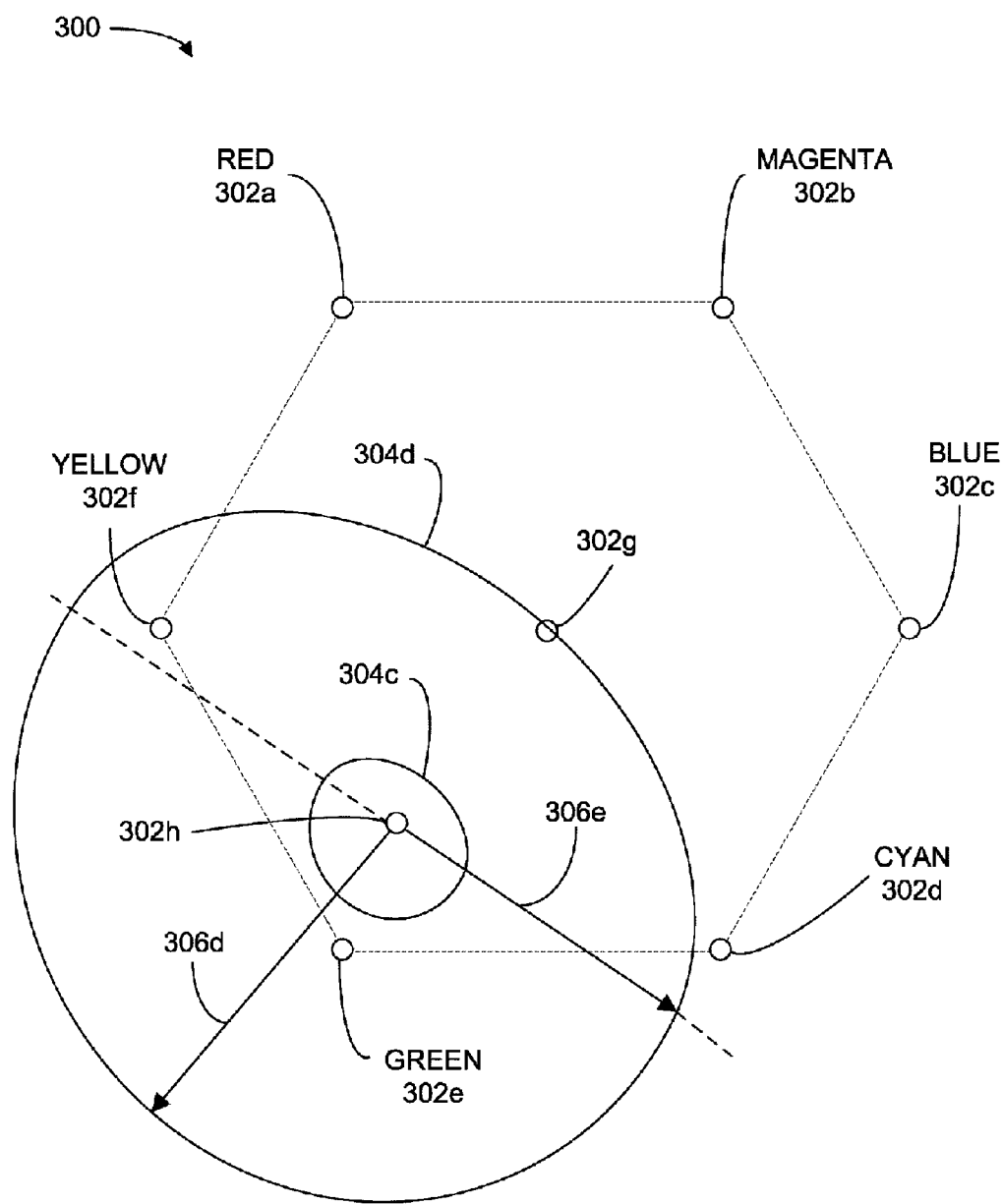

FIGS. 3A and 3B illustrate components of example image data in the XY-plane 300 of the XYZ color space. In FIGS. 3A and 3B, eight reference points 302a, 302b, 302c, 302d, 302e, 302f, 302g, and 302h are illustrated. The point 302g is the origin of the XY-plane, which represents colors having zero chrominance components (e.g., black, white, and grayscale), and thus having zero saturation. The point 302a represents X and Y coordinates of the color red; the point 302b represents X and Y coordinates of the color magenta; the point 302c represents X and Y coordinates of the color blue; the point 302d represents X and Y coordinates of the color cyan; the point 302e represents X and Y coordinates of the color green; the point 302f represents X and Y coordinates of the color yellow. A point 302h represents a reference color. For example, the point 302h may represent the color of a substantially green backdrop. In some cases, the reference color varies in different regions of the background image (e.g., due to lighting, shadows, camera optics, and/or other effects). When processing source data that includes a portion of a source image, a corresponding portion of the background image can be used for reference data. In some implementations, the distance between the points 302h and 302g represents the saturation of the portion of the background image.

FIG. 3A illustrates information related to calculating a source image weighting value in an example implementation. The region 304a represents a first tolerance range of the reference color. The first tolerance range may be specified, for example, by tolerance parameters and/or other parameters that specify a range of colors that are considered to be related to the color of a backdrop. When the difference image data is not scaled by the saturation of the reference data, source data indicating a color outside the region 304a results in a maximum source image weighting value (e.g., indicating an opaque region). The region 304b represents a second tolerance range of the reference color. The second tolerance range may be specified, for example, by tolerance parameters scaled by the saturation of the reference data. When the difference image data is scaled by the saturation of the reference data, source data indicating a color outside the region 304b results in a maximum source image weighting value (e.g., indicating an opaque region). Inside the region 304b, source data indicating a color closer to the reference point 302h may result in a lower source image weighting value, while source data indicating a color farther from the reference point 302h may result in a higher source image weighting value. In the illustrated example, source data indicating a color having zero chrominance results in a maximum source image weighting value. A difference vector 306a represents the difference between components of an example source vector and components of an example reference vector. A scaled difference vector 306b represents the vector 306a scaled by the saturation of the reference color.

FIG. 3B illustrates information related to calculating a color correction to a color channel in an example implementation. The region 304c represents a first range of colors that can be removed from a source image to generate a color channel. For example, the size and shape of the region 304c can be based on the spill range parameter 270, the desaturate parameter 274, and/or other factors that specify a range of colors that are considered to be related to the color of a backdrop. When the difference image data is not scaled by the saturation of the reference data, source data indicating a color outside the region 304c may be preserved in the color channel. The region 304d represents a second range of colors that can be removed from a source image to generate a color channel. The second range may be specified, for example, by spill range and desaturate parameters in combination with the saturation of the reference data. When the difference image data is scaled by the saturation of the reference data, source data indicating a color outside the region 304b may be preserved in the color channel. In the illustrated example, source data indicating a color having zero chrominance is preserved in the color channel. Vectors 306e and 306d represent parameters that can increase tolerance to color deviations. Vector 306d represents a parameter that increases tolerance to deviations in saturation, and vector 306c represents a parameter that increases tolerance to deviations in hue. As shown, adjusting the tolerance parameters modifies the range of colors that are considered to be related to the backdrop color.

Figure 4:
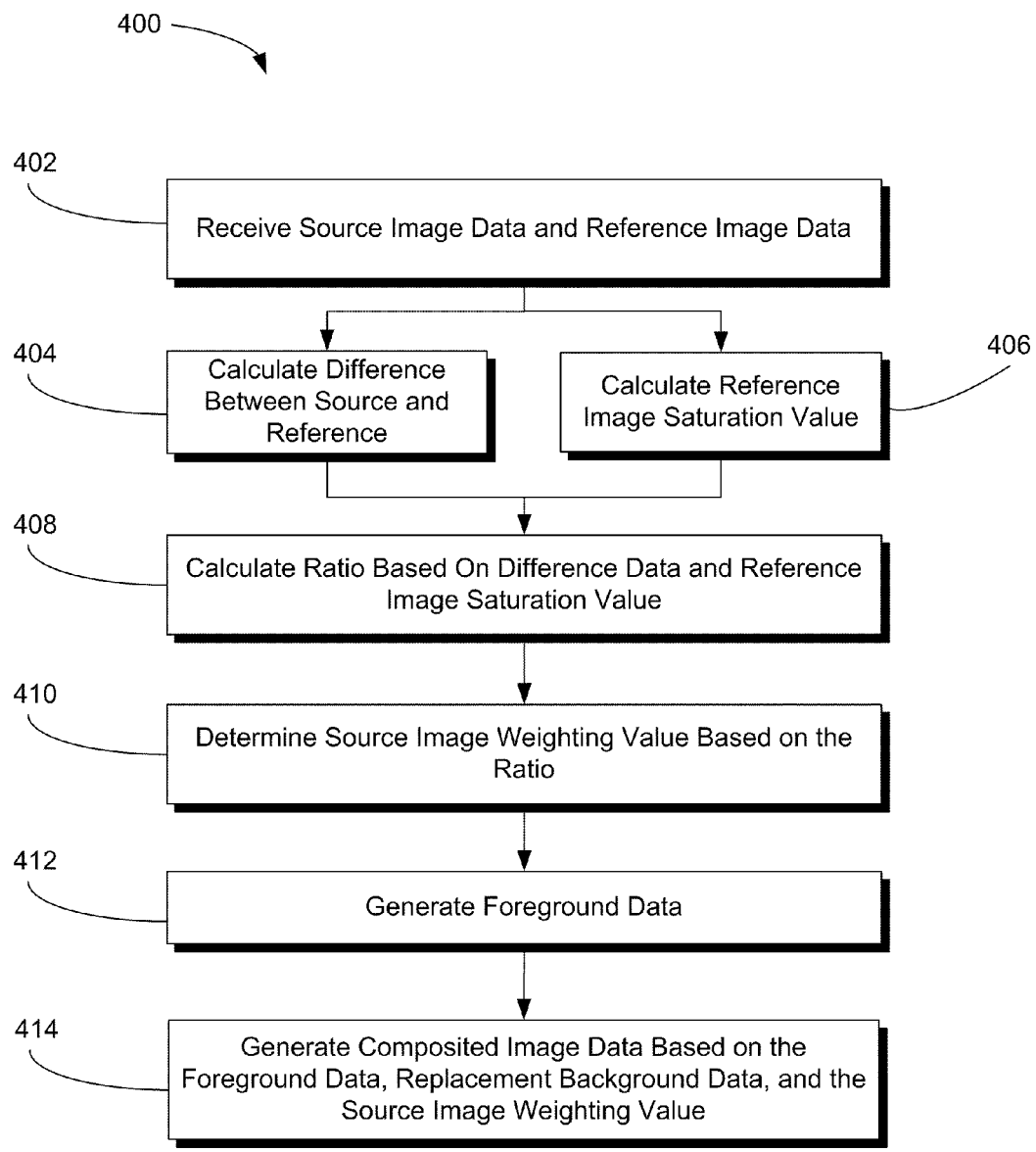
FIG. 4 is a flow chart illustrating an example process for chroma keying.

FIG. 4 is a flow chart illustrating an example process for chroma keying. At 402, source image data and reference image data are received. The source image data include a portion of a source image. The source image includes one or more foreground regions and one or more background regions. In some implementations, the background regions portray a blue or a green backdrop, and the foreground regions portray foreground objects (e.g., people, furniture, and/or other types of objects) in front of the blue or green backdrop. The reference image data includes a portion of a background image. In some implementations, the background image portrays the blue or green backdrop that appears in the background regions of the source image, including regions of the backdrop that are partially or fully blocked in the source image by foreground objects. The reference data may include one or more pixels. The source data may include one or more pixels. The reference data and the source data may represent corresponding regions of the source image and the background image. For example, the source data and the reference data may include pixels having the same indices in a pixel array.

At 404, difference data is calculated. The difference data relates to a difference between the source data and the reference data. The difference data may be calculated by subtracting a component of the reference data from a component of the source data. The difference data may be based on the magnitude of the result of subtracting a component of the reference data from a component of the source data. For example, the reference data and the source data may each include a vector in the XYZ color space. The vectors may be projected to the XY-plane in the XYZ color space. The difference data may be the magnitude of the difference of the projected vectors.

At 406, a saturation value of the reference data is calculated. The saturation value relates to a saturation of the portion of the background image. The saturation may be calculated as the magnitude of a component of the reference data. For example, the reference data may include a vector in the XYZ color space. The vector may be projected to the XY-plane in the XYZ color space. The saturation value can be the magnitude of the projected vector.

At 408, a ratio is calculated based on the difference data and the saturation value. For example, the difference data may be divided by the saturation value to get the ratio. In some implementations, the ratio represents a normalized magnitude of a difference vector in the XY-plane. At 410, a source image weighting value is calculated based on the ratio. The source image weighting value may be calculated, for example, according to one or more equations or formulae. An example equation for calculating a source image weighting value is provided in Equation 9 above. A high source image weighting value may indicate that the source data portrays a foreground region, and a low source image weighting value may indicate that the source data portrays a background region. Source image weighting values for multiple portions of a source image can form an alpha channel. The alpha channel can be used to generate a composited image that is a combination of the source image and a replacement background image. The alpha channel can be used to determine the extent to which the replacement background image is visible in each region of the composited image.

At 412, foreground image data is generated. The foreground image data can be used to generate a color channel. The foreground image data may be generated by removing from the source data a range of colors that include and/or are similar to the reference color. The foreground image data may be generated by applying one or more filters to the source image. At 414, composited image data is generated based on the foreground image data, the source image weighting value, and replacement background image data. The replacement background image data can include a portion of an image of a replacement background.

Figure 5:
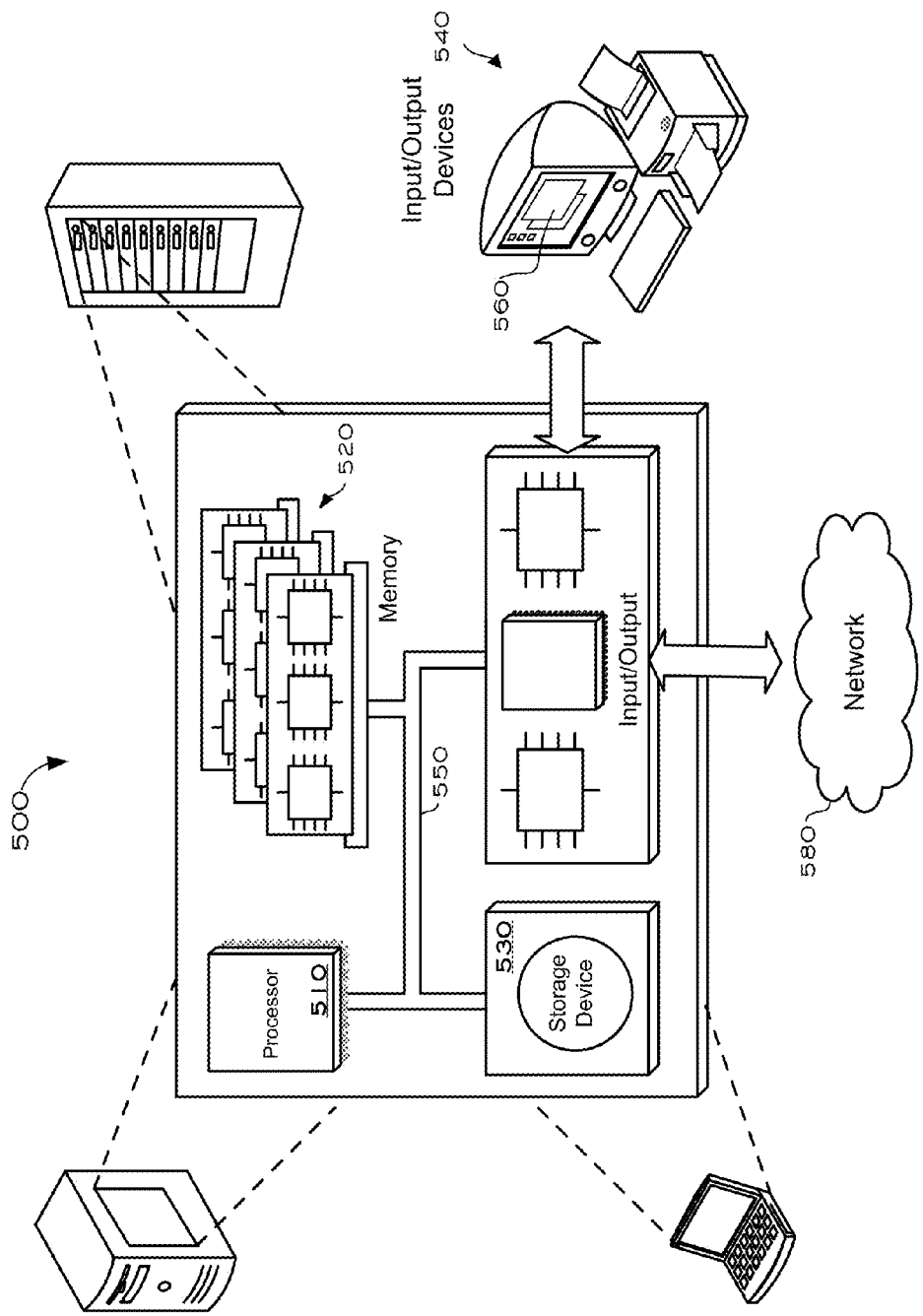
FIG. 5 is a diagram illustrating an example computing system.

FIG. 5 is a diagram of an example computer system 500 for implementing chroma keying techniques. In some implementations, chroma keying can be implemented in hardware, firmware, and/or software as part of the system 500. The system 500 can include a processor 510, memory 520, a storage device 530, and one or more input/output devices 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output devices 540. For example, the processor 510 may process data to display a graphical user interface 560 on a monitor. Some implementations of the computer system 500 can incorporate a stream processor architecture, multithreading processor optimization, SIMD processor optimization, and/or any of a wide range of GPUs. Hardware, software, and/or a combination of hardware and software in the system 500 may enable faster-than-real-time processing of large digital image sources (e.g., larger than 4K digital film sources). In some cases, the system 500 includes hardware and/or software capabilities equal to or greater than the capabilities required for running Pixel Shader 2.0 software.

The memory 520 is a computer readable medium such as volatile or non volatile that stores information within the system 500. The memory 520 can store data structures representing electronic documents, graphic objects, and datasets of graphic objects, for example. The storage device 530 is capable of providing persistent storage for the system 500. The storage device 530 may be a floppy disk device, a hard disk device, an optical disk device, or a tape device, or other suitable persistent storage means. The input/output device 540 provides input/output operations for the system 500. In some implementations, the input/output device 540 includes a keyboard and/or pointing device. In other implementations, the input/output devices 540 include a display unit for displaying graphical user interfaces. The system 500 can be connected to a network 580, such as the Internet, an intranet, or an ad hoc network. Information can be accessed and read from the network 580, such as electronic documents and their contents.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter generating or otherwise effecting a machine-readable signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the described techniques can be implemented using a variety of computer code languages and a wide range of processors, including entry-level GPUs. As another example, the actions recited in the claims can be performed in a different order and still achieve desirable results.

What is claimed is:

1. A computer implemented method comprising:
   receiving reference data comprising a portion of a first background image, the first background image comprising an image of a first background;
   receiving source data comprising a portion of a source image, the source image comprising an image of the first background and a foreground;
   calculating, by data processing apparatus, a reference saturation value based on the reference data, the reference saturation value relating to a saturation of the portion of the first background image;
   calculating, by data processing apparatus, a difference value based on the source data and the reference data, the difference value relating to a difference between the portion of the first background image and the portion of the source image;
   determining, by data processing apparatus, a source image weighting value for combining the source image with a replacement background image, the replacement background image comprising an image of a replacement background, the source image weighting value based at least in part on a ratio between the difference value and the reference saturation value; and
   storing the source image weighting value on a computer-readable medium.

2. The method of claim 1, wherein determining a source image weighting value relates to determining whether the source data corresponds to a foreground region of the source image or a background region of the source image.

3. The method of claim 1, wherein the source data comprise a source vector in a color space, the reference data comprise a reference vector in the color space, and the difference value comprises a magnitude of a result of subtracting a component of the reference vector from a component of the source vector.

4. The method of claim 1, wherein the reference data comprise a reference vector in a color space, and the reference saturation value comprises a magnitude of a component of the reference vector.

5. The method of claim 1, further comprising transforming at least one of the source data or the reference data from a first color space representation to an XYZ color space representation.

6. The method of claim 1, wherein the source data comprise a source vector in an XYZ color space, the reference data comprise a reference vector in the XYZ color space, the XYZ color space comprises an XY-plane, the reference saturation value is related to a magnitude of a component of the reference vector in the XY-plane, and the difference value is related to a difference between a component of the source vector in the XY-plane and a component of the reference vector in the XY-plane.

7. The method of claim 1, further comprising combining the source image with a replacement background image to generate a composited image based on the source image weighting value.

8. The method of claim 1, further comprising calculating foreground data based at least in part on the source image weighting value.

9. The method of claim 7, wherein combining the source image with the replacement background image comprises:
   receiving replacement data comprising the replacement background image;
   scaling foreground data by a first factor, the first factor based at least in part on the source image weighting value;
   scaling the replacement data by a second factor, the second factor based at least in part on the source image weighting value; and
   summing the scaled foreground data and the scaled replacement data.

10. The method of claim 1, wherein the reference data comprises a single pixel of the first background image and the source data comprises a single pixel of the source image.

11. The method of claim 1, wherein the reference data comprises multiple pixels of the first background image and the source data comprises multiple pixels of the source image.

12. A computer program product, encoded on a non-transitory computer-readable medium, operable when executed to cause data processing apparatus to perform operations comprising:
   receiving reference data comprising a portion of a first background image, the first background image comprising an image of a first background;
   receiving source data comprising a portion of a source image, the source image comprising an image of the first background and a foreground;
   calculating a reference saturation value based on the reference data, the reference saturation value relating to a saturation of the portion of the first background image;
   calculating a difference value based on the source data and the reference data, the difference value relating to a difference between the portion of the first background image and the portion of the source image;
   determining a source image weighting value for combining the source image with a replacement background image, the replacement background image comprising an image of a replacement background, the source image weighting value based at least in part on a ratio between the difference value and the reference saturation value; and storing the source image weighting value.

13. The computer program product of claim 12, wherein at least one of the source data or the reference data comprise a vector in a device-independent color space.

14. The computer program product of claim 12, wherein the source data comprise a source vector in an XYZ color space, the reference data comprise a reference vector in the XYZ color space, the XYZ color space comprises an XY-plane, the reference saturation value is related to a magnitude of a component of the reference vector in the XY-plane, and the difference value is related to a difference between a component of the reference vector in the XY-plane and a component of the source vector in the XY-plane.

15. The computer program product of claim 12, wherein determining a source image weighting value comprises:

calculating a dot product between a difference vector and a reference vector, the difference vector relating to the difference between the portion of the source image and the portion of the first background image, the reference vector relating to the portion of the first background image; and calculating the source image weighting value based on the dot product and the ratio.

16. A system comprising:

a user interface device; and one or more computers operable, upon execution of computer-readable instructions, to interact with the user interface device and to:

receive reference data comprising a portion of a first background image, the first background image comprising an image of a first background;

receive source data comprising a portion of a source image, the source image comprising an image of the first background and a foreground;

calculate a reference saturation value based on the reference data, the reference saturation value relating to a saturation of the portion of the first background image;

calculate a difference value based on the source data and the reference data, the difference value relating to a difference between the portion of the first background image and the portion of the source image;

determine a source image weighting value for combining the source image with a replacement background image, the replacement background image comprising an image of a replacement background, the source image weighting value based at least in part on a ratio between the difference value and the reference saturation value; and store the source image weighting value.

17. The system of claim 16, the one or more computers further operable to transform the received source data from a first color space to an XYZ color space.

18. The system of claim 17, the one or more computers further operable to:

generate foreground data based at least in part on the transformed source data; and transform the foreground data from the XYZ color space to the first color space.

19. The system of claim 16, wherein the source data comprise a source vector in an XYZ color space, the reference data comprise a reference vector in the XYZ color space, the XYZ color space comprises an XY-plane, the reference saturation value is related to a magnitude of a component of the reference vector in the XY-plane, and the difference value is related to a difference between a component of the reference vector in the XY-plane and a component of the source vector in the XY-plane.

20. The system of claim 16, the source data comprising a source luminance component and a source chrominance component, the reference data comprising a reference luminance component and a reference chrominance component, the reference saturation value based at least in part on the reference chrominance component, the difference value based at least in part on the reference chrominance component and the source chrominance component.

* * * * *